United States Patent [19]

Daio et al.

[11] Patent Number: 5,268,402

[45] Date of Patent: Dec. 7, 1993

[54] RUBBER COMPOSITION

[75] Inventors: Masayoshi Daio, Hiratsuka; Shigeru Shinoda, Chigasaki; Hideki Ishida, Hiratsuka, all of Japan

[73] Assignee: The Yokohama Rubber Co., Ltd., Tokyo, Japan

[21] Appl. No.: 950,697

[22] Filed: Sep. 25, 1992

[30] Foreign Application Priority Data

Oct. 4, 1991 [JP] Japan .................... 3-257843

[51] Int. Cl.$^5$ .......................... C08K 5/3492
[52] U.S. Cl. ...................................... 524/100
[58] Field of Search .......................... 524/100

[56] References Cited

U.S. PATENT DOCUMENTS 4,550,147 10/1985 Oohara ................... 525/348
5,196,464 3/1993 Shinoda et al. ........... 524/100

FOREIGN PATENT DOCUMENTS 57-070138 4/1982 Japan .

Primary Examiner—Veronica P. Hoke
Attorney, Agent, or Firm—Finnegan, Henderson, Farabow, Garrett & Dunner

[57] ABSTRACT

A rubber composition for use in steel-belted automobile tires containing specified amounts of a partial condensate of hexaethylolmelamine pentamethylether, a cresol resin, sulfur and a cobalt resin of an organic acid, thereby exhibiting improved adhesion to metal in warm water after vulcanization and increased extension on break after aging.

5 Claims, No Drawings

RUBBER COMPOSITION

BACKGROUND OF THE INVENTION

1. Technical Field

This invention relates to rubber compositions particularly for use in the manufacture of automobile tires of a steel-belted configuration.

2. Prior Art

To cope with strict quality requirements for automobile tires, steel-belted tires have been widely used for their good driving stability, high abrasive resistance and other superior physical properties compared to conventional tires. A key determinant of the quality of steel-belted tires is the adhesion between steel cords and rubber coats. This parameter of adhesion dominates the service life of the tire exposed to various environmental conditions during and subsequent to its processing stage and delivery to the user.

To manufacture a steel-belted tire, the starting rubber should have sufficient "initial adhesion" to the steel cords at the time of vulcanization. Unvulcanized rubber, however, tends to absorb moisture and hence decline in its adhesive property, namely "adhesion in water before vulcanization". Vulcanized rubber is also liable to suffer a reduction in its adhesive property, namely "adhesion in water after vulcanization", due to penetration of moisture in the air through the rubber coat into the steel cords during use of the resulting tire. Moreover, if the tire gets cuts or nail punctures in its tread portion during running, water will penetrate into the tire through those damaged portions. This water is warmed up by the heat generated in the running tire and flows through the interstices of the steel cords, causing the rubber coat to separate due to a loss of its adhesive property, namely "adhesion in warm water after vulcanization".

Various rubber compositions are known which are developed to meet some, but not all, of the above adhesion requirements.

The vulcanization process in the manufacture of steel-belted tires is mainly responsible for productivity. Vulcanization may be effected for a shorter period of time but at a higher temperature. However, conventional rubber compositions containing cobalt salts of organic acids will in most cases show a sharp decline, because of the higher vulcanization temperature, in their "adhesion in water before vulcanization", "adhesion in water after vulcanization" and "adhesion in, warm water after vulcanization". Those cobalt salts are commonly accepted as conducive to adhesion to steel cords in the rubber art.

In general, rubbers of high hardness and high modulus are chosen to cover hard steel cords for steel-belted tires. Such hard rubbers often incorporate large quantities of sulfur and carbon black and exhibit high hardness and modulus properties upon vulcanization. At the same time, however, they are susceptible to insufficient extension on break and objectionable separation at a belt end portion, namely breakage of the rubber coat between belt layers.

SUMMARY OF THE INVENTION

With the foregoing drawbacks of the prior art in view, the present invention seeks to provide a rubber composition that has enhanced adhesive strength with respect to steel cords in terms of "initial adhesion", "adhesion in water before vulcanization", "adhesion in water after vulcanization" and "adhesion in warm water after vulcanization". Further, the composition will exhibit high rubber hardness and superior breaking extension after aging.

The rubber composition according to the invention is particularly useful and effective in coating the steel cords for use in steel-belted tires.

Breaking extension after aging among the above physical characteristics is important for the rubber composition to be applicable to the steel cords. Failure to meet this property leaves the problem that the ultimate composition will involve insufficient resistance to cracking and hence objectionable separation at a belt end during running of the tire.

More specifically, the invention provides a rubber composition comprising 100 parts by weight of a starting rubber and, based on the weight of the starting rubber, 5 to 10 parts by weight of a partial condensate of hexamethylolmelamine pentamethylether, 0.5 to 5 parts by weight of a cresol resin, 2.5 to 5 parts by weight of sulfur and 0.1 to 0.8 part by weight of a cobalt salt of an organic acid in terms of the cobalt element.

DETAILED DESCRIPTION OF THE INVENTION

A rubber composition of the present invention is comprised essentially of the following components.

(a) Starting Rubbers

Natural rubber (NR) may be used alone or in combination with a synthetic isoprene rubber (IR) or a diene rubber. Suitable diene rubbers are chosen from butadiene rubber (BR), styrene-butadiene rubber (SBR) and the like.

(b) Partial Condensates of Hexamethylolmelamine Pentamethylether

Partial condensates titled above and used herein are represented by the formula

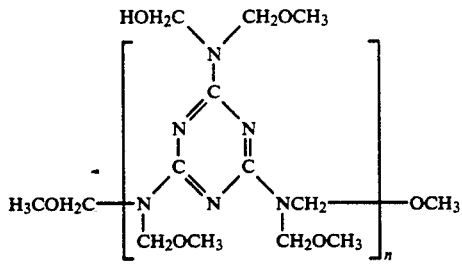

where n is 1 to 3. These condensates, hereinafter referred to simply as "partial condensates of melamine", have been marketed for instance by Sumitomo Chemical Company as Sumicanol 507 known to have such a condensate content of 50%. Other polymethoxymelamines such as for example hexamethoxymethylmelamine, however, are not eligible for the purpose of the invention. The partial condensate of melamine should be used in an amount of 5 to 10 parts by weight per 100 parts by weight of the starting rubber. Smaller amounts than 5 weight parts would result in insufficient rubber hardness, and larger amounts than 10 weight parts would lead to unacceptable extension on break after aging.

(c) Cresol Resins

Cresol resins useful in the invention may be in ortho, meta and para forms readily available in commerce. A metacresol resin among all these forms is particularly preferred which has been supplied for instance by Sumitomo Chemical Company as Sumicanol 610 and which should be added in an amount of 0.5 to 5 parts by weight per 100 parts by weight of the starting rubber. Less than 0.5 weight part would fail to gain sufficient rubber hardness, while more than 5 weight parts would lead to inadequate breaking extension and adverse heat buildup in vulcanized rubber.

(d) Sulfur

The amount of sulfur should range from 2.5 to 5 parts by weight per 100 parts by weight of the starting rubber. This component if less than 2.5 weight parts would not be effective to improve adhesion to metal and if more than 5 weight parts would render the ultimate tire physically weak after vulcanization, resulting in cracked tire during running.

(e) Cobalt Salts of Organic Acids

Typical examples of this component include cobalt salts derived from straight-chain or branched-chain monocarboxylic acids of 5 to 20 in carbon number and selected from cobalt naphthenate, cobalt stearate, cobalt octylate, cobalt oleate and the like. The amount of the cobalt salt to be used should be set in the range of 0.1 to 0.8 part by weight per 100 parts by weight of the starting rubber. Below 0.1 weight part would be ineffective as a whole, whereas above 0.8 weight part would be feasible only in an expensive manner.

Various other additives may be employed, as is known in the rubber art, which are selected from carbon blacks, zinc oxides, vulcanization acceleraors, aging inhibitors and the like.

EXAMPLES

The following examples are given to further illustrate the present invention.

Three inventive rubber compositions and six comparative counterparts were formulated by weight part as shown in the table below. Performance evaluation was made of metal adhesion and separation resistance with the results listed in that table.

Adhesion to Metal (1) Initial Adhesion

Brass-plated steel cords of a 1×5 construction spaced 12.5 mm apart in parallel were coated from both sides with each of the test rubber compositions into a fabric web of a 25 mm width which was subsequently vulcanized at 170° C. for 20 minutes. The resulting sample was subjected to drawing of the steel wires by the ASTM D-2229 procedure. The magnitude of rubber coat after drawing was measured to determine the initial adhesion of the rubber composition.

(2) Adhesion in Warm Water after Vulcanization

The sample prepared as in item (1) above was immersed in warm water at 70° C. with the steel wires cut at one end and thus let to stand for 4 consecutive weeks, followed by drawing of the wires.

Resistance to Separation

With the use of a belt layer formed of steel cords coated with each of the test rubber compositions, a tire of a 165 SR13 size was produced and exposed to a thermal condition at 80° C. for 4 days, which condition was assumed to be a target endpoint of continuous running of the tire. The tire was inflated to an air pressure of 1.2 kg/cm$^2$ and then run on a test drum with a slip angle of ±3°, a camber angle of 2° and a load of 127% and at a speed of 60 km/hr for a distance of 6,000 km. This drum test was conducted by the JATMA standards. The tire was dismantled to measure the extent or amount of separation at an end portion of the belt layer. For purposes of comparison, the value obtained with Comparative Example 1 was taken as a reference index of 100. The better the separation resistance, the smaller index.

Tensile Strength and Breaking Extension

JIS K-6301 was followed with a No. 3 dumbell specimen.

Hardness

Measurement was made by the JIS K-6301 procedure.

The test results demonstrate that the rubber compositions of Inventive Examples 1 to 3 afford improved adhesion to metal in warm water after vulcanization while maintaining increased extension on break after aging. Such physical characteristics contemplated under the invention are not attainable for failure to meet even one of the requirements specified by the invention. This is evident from Comparative Example 3 devoid of the partial condensate of melamine but inclusive of a hexamethylolmelamine, from Comparative Example 1 rich in sulfur but poor in partial condensate of melamine, from Comparative Example 2 excessive of sulfur, from Comparative Example 5 too much in partial condensate of melamine and from Comparative Example 6 insufficient in sulfur content.

| Run | CE1 | CE2 | CE3 | CE4 | IE1 | IE2 | IE3 | CE5 | CE6 |
|---|---|---|---|---|---|---|---|---|---|
| natural rubber (RSS #1) | 100 | 100 | 100 | 100 | 100 | 100 | 100 | 100 | 100 |
| carbon black (HAF) | 60 | 60 | 60 | 60 | 60 | 60 | 60 | 60 | 60 |
| zinc oxide | 10.00 | 10.00 | 10.00 | 10.00 | 10.00 | 10.00 | 10.00 | 10.00 | 10.00 |
| aging inhibitor (phenylenediamine) | 1.00 | 1.00 | 1.00 | 1.00 | 1.00 | 1.00 | 1.00 | 1.00 | 1.00 |
| cobalt naphthenate[*1)] | 3 | 3 | 3 | 3 | 3 | 3 | 3 | 3 | 3 |
| (cobalt element) (%) | (0.3) | (0.3) | (0.3) | (0.3) | (0.3) | (0.3) | (0.3) | (0.3) | (0.3) |
| sulfur | 6.00 | 6.00 | 4.50 | 4.50 | 4.50 | 4.50 | 3.00 | 3.00 | 2.00 |
| accelerator[*2)] | 1.00 | 1.00 | 1.00 | 1.00 | 1.00 | 1.00 | 1.00 | 1.00 | 1.00 |
| meta-cresol resin[*3)] | 1.00 | 1.00 | | 1.00 | 1.00 | 1.00 | 2.00 | 2.00 | 2.00 |
| hexamethoxymethyl melamine[*4)] | | | 10.00 | | | | | | |
| hexamethylolmelamine pentamethylether, partial condensate[*5)] | 5.00 | 10.00 | | 5.00 | 10.00 | 15.00 | 15.00 | 22.00 | 15.00 |
| vulcanization properties (160° C. × 20 min) | | | | | | | | | |
| tensile strength (kgf/cm$^2$) | 219 | 206 | 204 | 216 | 213 | 220 | 210 | 206 | 215 |

-continued

| Run | CE1 | CE2 | CE3 | CE4 | IE1 | IE2 | IE3 | CE5 | CE6 |
|---|---|---|---|---|---|---|---|---|---|
| breaking extension (%) | 355 | 200 | 310 | 385 | 375 | 340 | 360 | 320 | 385 |
| hardness (JIS A) | 80 | 82.5 | 82.0 | 77.4 | 81.5 | 83.6 | 82.7 | 84.1 | 79.5 |
| after-age properties (80° C. × 48 hr) | | | | | | | | | |
| tensile strength (kgf/cm$^2$) | 200 | 193 | 196 | 204 | 212 | 205 | 203 | 198 | 206 |
| breaking extension (%) | 250 | 210 | 230 | 340 | 310 | 380 | 390 | 240 | 305 |
| initial adhesion (170° C. × 20 min) rubber coat (%) | 95 | 95 | 95 | 95 | 95 | 95 | 95 | 95 | 95 |
| adhesion in warm water (160° C. × 20 min) rubber coat (%) | 80 | 82 | 82 | 75 | 86 | 90 | 87 | 83 | 72 |
| separation resistance | 100 | 106 | 103 | 102 | 95 | 90 | 93 | 102 | 106 |

IE: Inventive Example
CE: Comparative Example
Notes to Table
*1) cobalt element content 10 wt. %
*2) N,N'-dicyclohexylbenzothiazole sulfenamide
*3) Sumicanol 610, Sumitomo Chemical Company
*4) Cyrez 964, American Cynamid Company
an amount of 10.00 weight parts in CE3 equal to a net weight part of 6.50 due to this product being 65% in effective ingredient content
*5) Sumicanol 507, Sumitomo Chemical Company
an amount of 15.00 weight parts in each of IE2 and IE3 equal to a net weight part of 7.50 due to this product being 50% in effective ingredient content

What is claimed is:

1. A rubber composition having enhanced adhesive strength with respect to steel consisting essentially of 100 parts by weight of a starting rubber selected from natural rubber alone or in combination with a synthetic isoprene rubber or a diene rubber and, based on the weight of said starting rubber, from 5 to 10 parts by weight of a partial condensate of hexamethylolmelamine pentamethylether having the formula

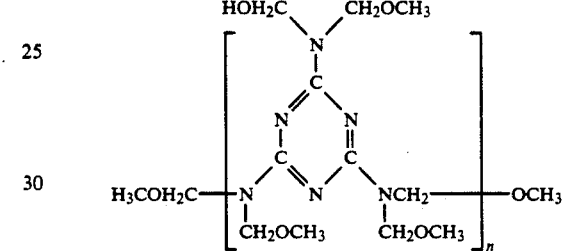

where n is from 1 to 3; from 0.5 to 5 parts by weight of a meta-cresol resin; from 2.5 to 5 parts by weight of sulfur; and from 0.1 to 0.8 part by weight of a cobalt salt of an organic acid in terms of the cobalt element.

2. The rubber composition of claim 1, wherein said diene rubber is selected from the group consisting of butadiene rubber and styrene-butadiene rubber.

3. The rubber composition of claim 1, wherein said cobalt salt of an organic acid is a cobalt salt of a straight-chain or branched-chain monocarboxylic acid having a carbon number of from 5 to 20.

4. The rubber composition of claim 3, wherein said cobalt salt is selected from the group consisting of cobalt naphthenate, cobalt stearate, cobalt octylate and cobalt oleate.

5. The rubber composition of claim 1, containing at least one non-adhesive additive selected from the group consisting of carbon black, zinc oxide, a vulcanization accelerator and an aging inhibitor.

* * * * *